Aug. 23, 1955    LE ROY OVERSTREET, JR    2,715,882
GRASS PLANTING MACHINE

Filed March 28, 1952                 3 Sheets-Sheet 1

Inventor
Le Roy Overstreet, Jr.

By *Henry H. Snelling*
Attorney

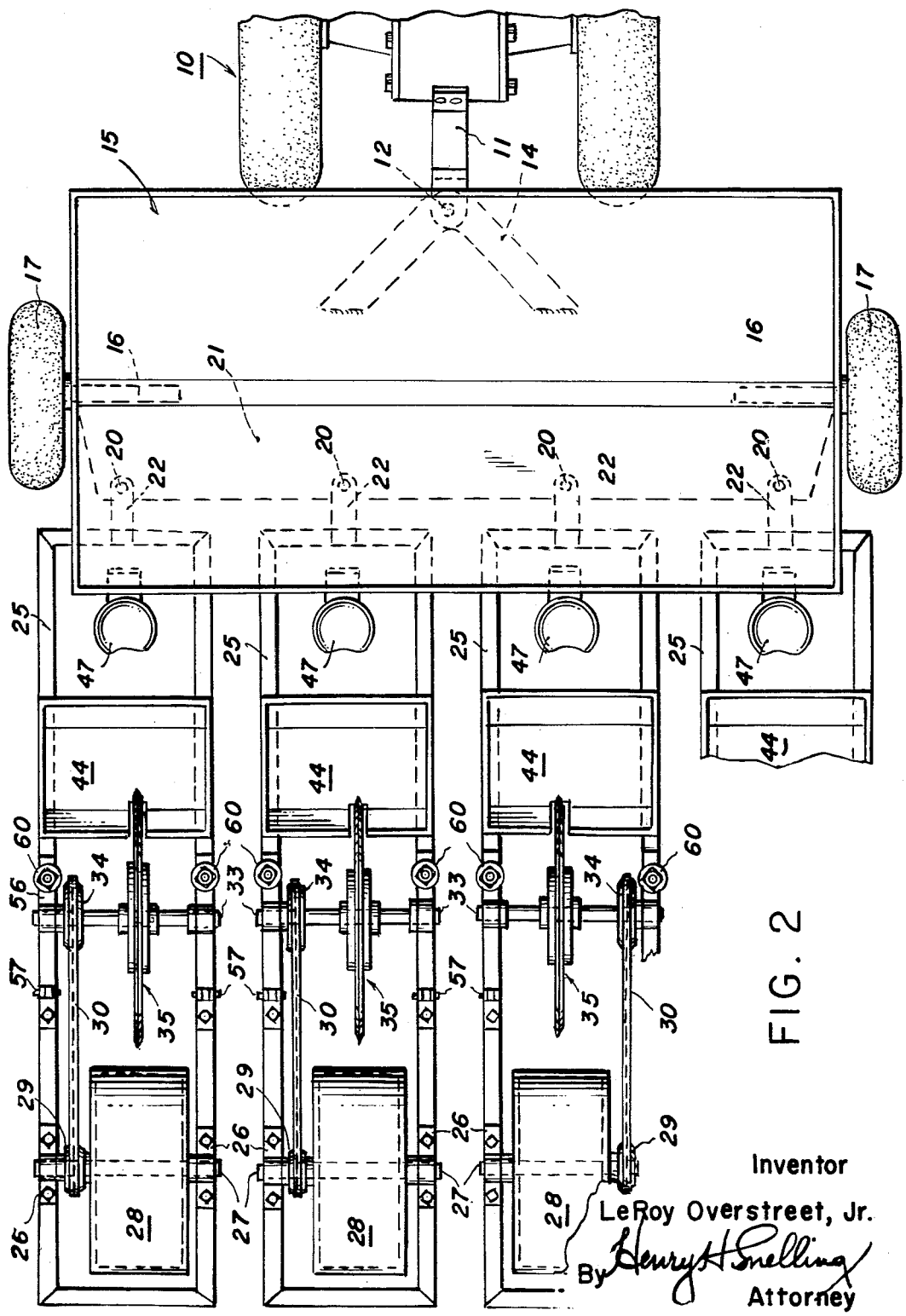

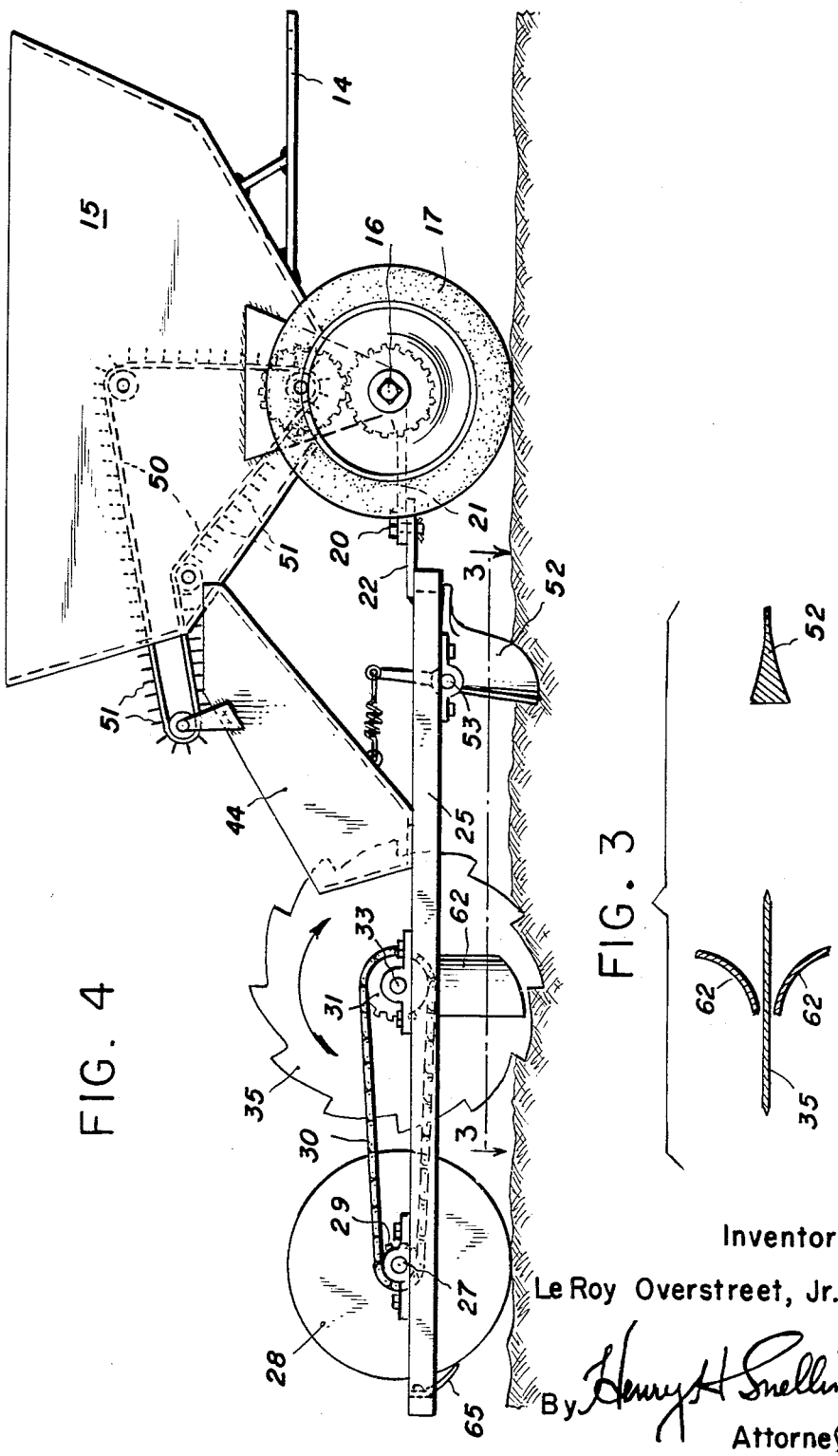

United States Patent Office 2,715,882
Patented Aug. 23, 1955

2,715,882
GRASS PLANTING MACHINE
Le Roy Overstreet, Jr., Loughman, Fla.
Application March 28, 1952, Serial No. 279,111
3 Claims. (Cl. 111—3)

This invention relates to devices for planting grasses and has for its object the provision of a simple device capable of planting grass of the Bermuda type over large areas in a manner to insure maximum rooting.

A further object of the invention is to provide a grass planting machine which can operate over uneven ground and make sharp turns while inserting grass stems into the ground so that they will be partially buried and pressing down the planted grass to insure that it will root from each of its many stem joints.

An important feature of the present invention is the provision of a grass planting disk driven at a speed of rotation appreciably less than that corresponding to the ground travel, this arrangement providing a sliding movement of the planting disk with respect to the ground. This facilitates the burying of the grass stems and it removes all tendency for the planted grass to follow the revolving disk.

A further object of the invention is to provide a tractor-driven grass hopper from which grass is fed either manually or automatically to a sub-hopper which straddles a grass planting wheel notched to remove a stem of grass from the hopper and to carry such stem beneath the surface of the ground. The assembly carries a relatively heavy soil packing roller in contact with the ground. Such roller, by means of a chain drives the planting disk at a speed to provide the sliding as well as the rotative action.

Other features of the invention are set forth in the claims and include among others the provision of an optional molder or soil slicing device and optional scrapers to throw soil in contact with the grass planting disk, and to prevent clayey soils from adhering to the roller.

At the present time the cost of planting grass suitable for dairy cattle is so high as to become a financial burden on dairymen and stock feeders. In many States grasses of the types which root at their stem joints are usually planted by hand. There have been a considerable number of attempts to plant such grasses in Southern States by machine but to date the trials have been far from satisfactory from any angle. The usual method of spreading the grass and then disking it in is not only inefficient and expensive but with this method a large percentage of the grass never takes root. Just why this is so is not definitely known. The present machine, however, plants such grasses as Pangola, Parah, Carib, Rose Lawn, St. Augustine, Bermuda, etc., in a most satisfactory manner, with a high degree of rooting. A practical test of the machine using manual supply from the main hopper to the disk hoppers not only accomplishes a better job than any of the usual methods but it does so at only 30% of the average cost of planting grass by the disking-in method.

While the machine illustrated is particularly suited for very light and sandy soils such as are found in Florida, the device can be used in practically any soil with or without such optional devices as a means to slice the soil or to open a trench, means to divert the displaced soil back to the center lines of the planting disks and scrapers for the large heavy soil packing rollers which are at the end of the outfit or assembly. In many soils neither the molder or furrow maker nor the scrapers or deflectors, nor the packing roller scrapers are either necessary or desirable as the soil or sand is quite fluid and the planting disks readily press into the soil to a sufficient depth to insure accurate placing of the grass stems for quickest and surest rooting. The grass which is to be planted by the present machine is cut from a field of standing grass so the cuttings would vary from even as little as a foot to 40" or more. These grasses all have joints about 1½" apart and when a stem is properly planted, well covered with nicely packed soil, it will give off roots at each of the many joints in the well known manner. If the rows are 30" or so apart, the grass will spread rapidly transversely and fill the space between the planted rows.

In the drawings:

Figure 2 is a plan view of a slightly modified form.

Figure 3 is a horizontal section showing optional features.

Figure 4 is a modification.

Figure 1:
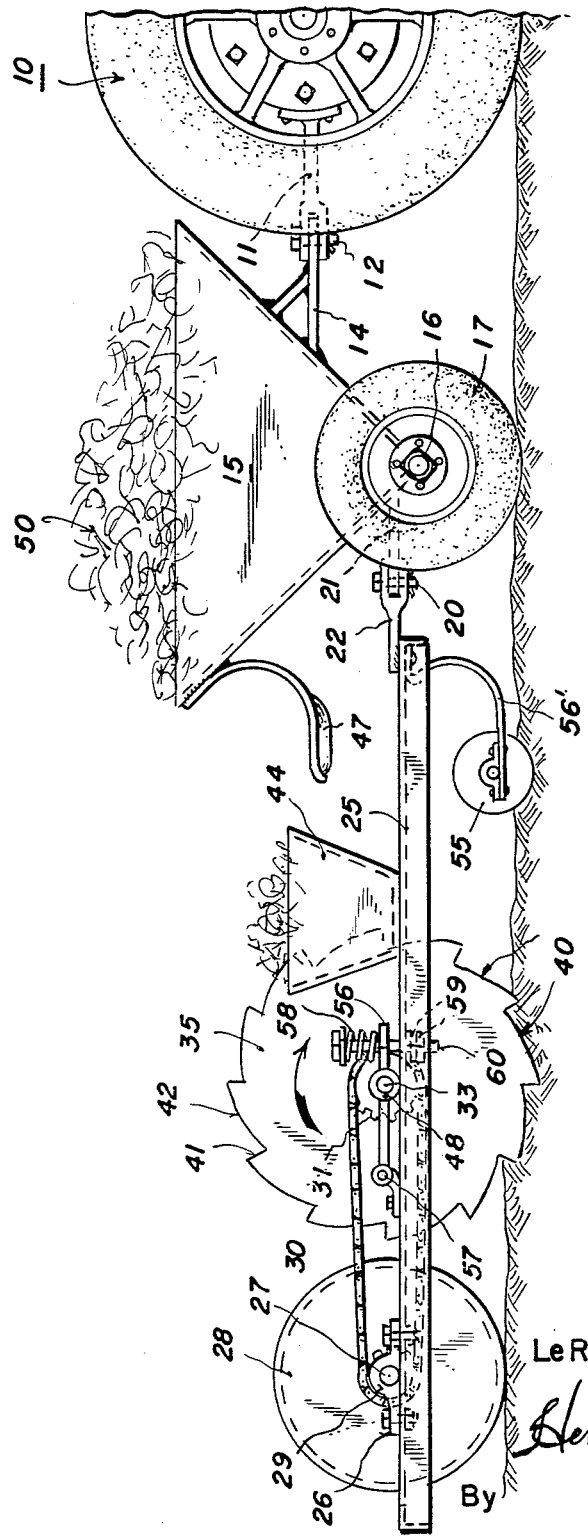
Figure 1 is a side elevation of my device in its present preferred form.

The entire assemblage includes a tractor 10, having a draw-bar 11, to which is pivoted as at 12 a stem 14 permanently secured as, for example by welding, to the V-shaped steel body 15 which forms the main hopper. In the preferred form the hopper is quite wide and at each short side has welded to the bottom of the hopper an axle 16 on which is mounted the ground wheel 17, these two wheels extending far to each side of the other parts of the assembly. A pivot connection 20 joins a bar 21 fixed to the main hopper 15 to a bar 22 welded or otherwise secured to the following or trailing rectangular hollow frame 25 towed by the tractor and the hopper. The couplers 12 and 20 provide flexible joints, freely movable laterally but preferably allowing but little relative vertical movement, thus providing greater stability. Each of the four or more frames 25 is less than one fourth the width of the main hopper 15 altho appreciably longer front to back than the main hopper. They are usually spaced apart laterally to give a clearance between them to allow of the making of sharp turns so the centerlines of adjacent frames are about 30" apart, giving an overall planting width of about 10 feet and a hopper width of 16 feet, more or less.

At the rear end of each hollow frame member 25 is mounted a bearing 26 carrying the axle 27 of a packing roller 28. This roller 28 can be of any desired material, for example, a solid concrete cylinder or a cylindrical metal tank which can be filled with water to give the desired weight. Each axle 27 carries a small sprocket 29 which drives a chain 30 engaging sprocket 31 on axle 33 of the notched grass planting disk or wheel 35. The sizes of the disks and rollers are such as to insure easy clearance over the plowed earth. I much prefer that the sprocket 31 shall be appreciably larger than the sprocket 29 at a ratio of from 3 to 2 to 3 to 1, preferably about 2 to 1. A very satisfactory ratio is had with the packing roller pinion 29 having 28 teeth and the planting wheel pinion 31 having 48 teeth.

The advantage of the disk rotating slower than the roller, the rotation of which varies with the ground speed of the assembly is that this provides a slipping or sliding action with the rotating effect. Not only does the soil lift the grass stems out of the notches of the disks as the stems cling to the soil rather than to the disk but the slow turning deposits the grass cuttings exactly where they should be and avoids any tendency for the grass stem to follow the disk up or out of the furrow as the unit moves forwardly. The notches or teeth in the disk move forwardly and downwardly as indicated by the arrow in Figure 1 at an angular speed appreciably slower than if the disk were a mere ground wheel resting on the ground, this to the end that the disk slides in the soil during rotation and thus the grass cuttings are pulled away from the notches and remain just about where they entered the ground. If the speed of the planting disks were roughly the same as if the disk were a mere ground wheel, the cuttings would be moved rearward of the point where they entered the ground and there would be a tendency for the grass cuttings to make the complete travel through the ground and be dropped behind the wheel. The disk pulls the cuttings into the ground and because of the relation between the angular speed of the disk and its forward motion the disk moves forwardly away from the buried cuttings.

The earth or soil packing roller 28 may be nearly the same transverse width as the space between the long sides of the frame 25, but a width of 18" and a diameter of two feet seems to work best. The grass planting disk or wheel 35 is quite thin: ¼" thick and 36" in diameter being an excellent size. This steel disk has a dozen or so notches 40 in its periphery, one side of the notch as 41 being about radial and the remaining side 42 being curved to provide ample space for the reception of the stem of grass which is picked up by the notch side 41 as the disk 35 revolves thru a relatively narrow slot in a sub-hopper 44 mounted on the frame 25. The disk 35 and the roller 28 are centered in the hollow frame which is supported at its rear end by the roller, the front end being pivoted to the main hopper body which prevents rocking of the frame about the axis of the roller 28.

In the preferred form the hopper 15 carries seats 47 centered with respect to the wheels 35. The operator seated thereon merely reaches behind him and takes grass cuttings 50 from the main hopper or reservoir 15 and places them in the sub-hopper 44. The main hopper is replenished from time to time by fresh supplies brought up by trucks.

In the modified form shown in Figure 4 transfer of grass cuttings from the main hopper to the smaller or auxiliary hopper is automatic, an endless belt of any suitable type being used. This endless belt 50 driven in any manner may have pegs 51 or other devices which transfer the grass cuttings from the main hopper to the auxiliary hoppers 44 each straddling one of the four grass planting disks. In this figure I have shown an optional molder 52 pivoted as at 53 to the main hopper and resiliently held in desired position by an adjustable spring 54 which permits the molder to yield upon striking an obstruction. These molders 52, like the soil slicing wheels 55 held to the frame 25 by flat springs 56', are quite optional in light soils. The planting wheels 35 whether fast to the frame 25 or as preferably mounted in a bearing 48 carried by a lever 56 pivoted as at 57 and resiliently urged toward the frame 25 by a spring 58 adjustable by turning the nuts 59 on stem 60, is able to press the grass roots into the trench or furrow which the planting wheel 35 itself makes. By compressing or releasing spring 58 the degree of penetration is readily adjusted, and this is quite advantageous.

A further optional device shown in Figure 4 is the deflector 62. These deflectors are mounted in pairs, one on each side of the grass planting disk 35. Whether or not the molders 52 are used, these deflectors merely direct the earth laterally displaced by the planting wheel (and the molder if used) back toward the center line of the wheel or disk. The rear scrapers 65 are only used in somewhat sticky soils and have the obvious purpose of keeping the heavy roller 28 clean. In Florida soils this is never used.

For best results I prefer the tractor to pull the assembly at a rate somewhat faster than a brisk walk, say about five miles per hour. The grass cuttings are moved from the main hopper 15 to the individual or auxiliary hopper 44 where they are picked up by notches 40 of the several planting disks 35 which are abreast, turning in the direction they would turn if they freely engaged the soil but at a slower rate of turning. The peripheral speed is suffiient so the grass cuttings will not fall by gravity. The edge of the disk either makes a furrow or follows the furrow made by the knife wheel 55 or the molder 52 and deposits the cutting, usually folder about its middle, lengthwise in the furrow, this action being aided by the sliding contact with the two faces of the furrow trench. The deflectors, if used, move the earth toward the centerline of the disks and the rollers 28 pack the earth firmly over the buried grass cuttings.

What I claim is:

1. A two-wheeled hopper at least three times as wide as it is long, having a body V-shaped in longitudinal section, having at its forward or leading end a connection for towing of the hopper by a tractor, and having at its rear end a plurality of connector members, and a plurality of towed space grass planting units secured independently to said connector members, each of the units including a notched planting disk to penetrate the ground to bury grass cuttings fed to the notches of the disk from the hopper, said planting disks rotating at an angular speed slower than the speed determined by simple contact with the ground of a wheel having a radius equal to the distance from the axis of the disk to the ground level.

2. The combination of claim 1 in which the disks are resiliently mounted on the units and means are provided for adjusting the penetration of the disks into the earth.

3. The combination of claim 1 in which each grass planting disk moves through a slot in a sub-hopper receiving grass cuttings from the main hopper, the disks are roughly a quarter of an inch thick and about three feet in diameter and turn at an angular speed at which the grass cuttings will not fall from the disk by gravity in the space between the hopper and the ground when the hopper is towed at about five miles per hour.

References Cited in the file of this patent

UNITED STATES PATENTS

| | | |
|---|---|---|
| 85,195 | Young | Dec. 22, 1868 |
| 243,570 | Jefferson | June 28, 1881 |
| 357,100 | Ross | Feb. 1, 1887 |
| 395,250 | Reynolds | Dec. 25, 1888 |
| 490,942 | Bender | Jan. 31, 1893 |
| 491,597 | Sailer | Feb. 14, 1893 |
| 653,625 | Morgan | July 10, 1900 |
| 809,716 | Miller | Jan. 9, 1906 |
| 1,058,821 | Welker et al. | Apr. 15, 1913 |
| 1,080,429 | Edwards et al. | Dec. 2, 1913 |
| 1,230,806 | Shaffer | June 19, 1917 |
| 1,272,231 | Davis et al. | July 9, 1918 |
| 1,301,226 | Cady | Apr. 22, 1919 |
| 1,556,850 | Kuhne | Oct. 13, 1925 |
| 1,592,250 | Yerkes | July 13, 1926 |
| 1,881,933 | Powell | Oct. 11, 1932 |
| 1,924,133 | Schutmaat | Aug. 29, 1933 |
| 2,139,306 | Gaffney | Dec. 6, 1938 |
| 2,161,714 | Lindelof | June 6, 1939 |
| 2,163,802 | Oakley | June 27, 1939 |
| 2,473,261 | Ruhl | June 14, 1949 |
| 2,475,078 | Cherry | July 5, 1949 |
| 2,610,563 | Lambson | Sept. 16, 1952 |

FOREIGN PATENTS

| | | |
|---|---|---|
| 88,028 | Sweden | Dec. 1, 1936 |
| 97,308 | Sweden | Nov. 7, 1939 |
| 2,378 | Netherlands | Mar. 15, 1918 |
| 258,246 | Italy | Apr. 11, 1928 |
| 259,681 | Italy | July 26, 1928 |
| 280,547 | Italy | Dec. 12, 1930 |
| 282,596 | Italy | Feb. 17, 1931 |
| 313,640 | Italy | Jan. 2, 1934 |
| 455,180 | Italy | Feb. 14, 1950 |
| 616,960 | France | Nov. 8, 1926 |

OTHER REFERENCES

Agricultural Engineering for September 1947, page 415.